UNITED STATES PATENT OFFICE.

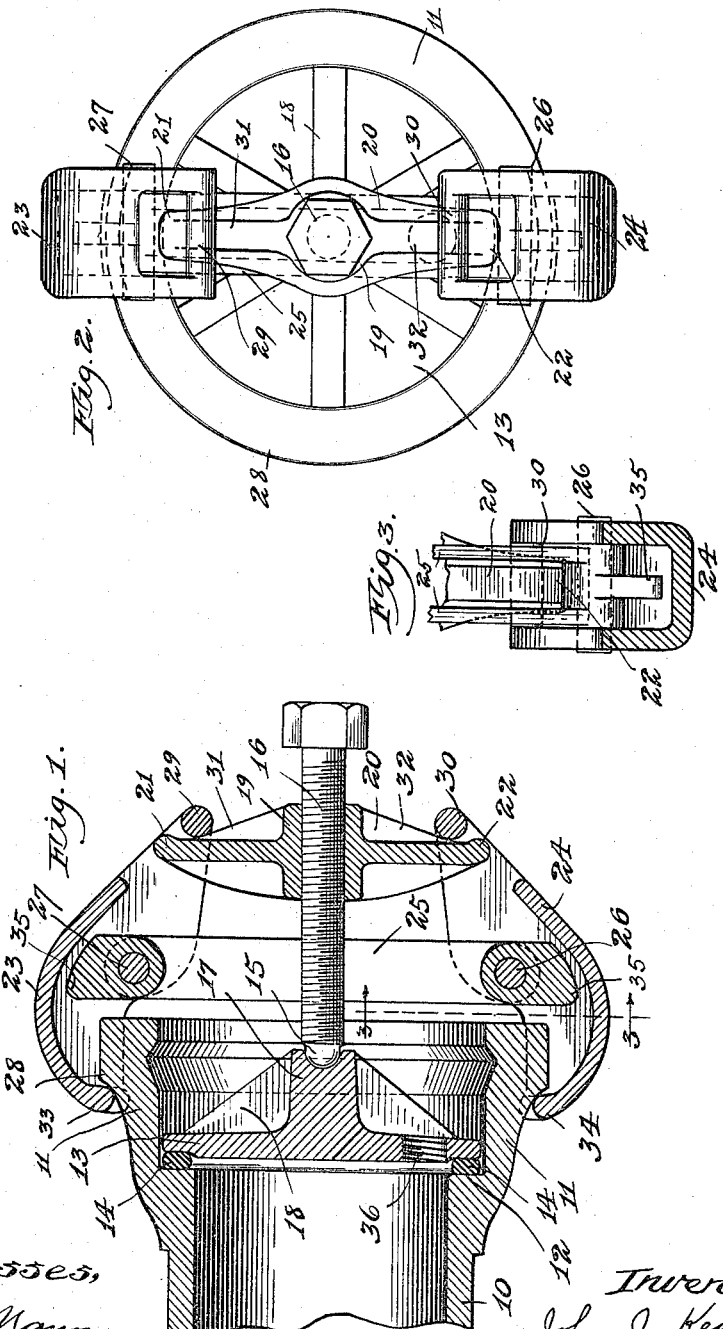

JOHN J. KENNY, OF CHICAGO, ILLINOIS.

PIPE-CLOSURE.

1,224,934.  Specification of Letters Patent.  Patented May 8, 1917.

Application filed November 20, 1916. Serial No. 132,310.

*To all whom it may concern:*

Be it known that I, JOHN J. KENNY, a citizen of the United States, residing at Chicago, in the county of Cook and State of Illinois, have invented certain new and useful Improvements in Pipe-Closures, of which the following is a specification.

My invention relates to improvements in pipe closures, and, although capable of many applications, is particularly designed for closing the open ends of pipes such as are employed in water supply systems.

Cast iron is the customary metal employed for the piping of underground systems in the United States, for several reasons. For example, cast iron does not corrode or rust so easily as wrought iron or steel, it is relatively cheap, and wastage due to electrolysis is not so serious on account of the fact that cast iron pipes are usually made thicker than are steel or iron pipes of the same bursting strength. Such cast iron piping almost universally consists of lengths connected together by what is termed a spigot-and-socket joint, the joint itself being calked by lead and oakum. It is often desirable, and in fact essential in many cases, to test a certain percentage of the pipes before insulation in order to insure that the piping meets the necessary specific requirements as to bursting strength, etc. In such cases, the ends of the pipe undergoing the test must of course be closed temporarily while the testing pressure is being applied to the pipe section. Also, when extending a new system of water supply, provision must be made for future extensions on undeveloped cross streets, etc., which is usually done by connecting onto the main supply pipe flanged ties or short sections of pipe, the open ends of which must of course be closed temporarily, pending the extension of the water supply system.

Such temporary closures as I have described have, up to the present, ordinarily been made by calking into the open socket of the cast iron pipe a solid plug, which is broken by a sledge hammer when its usefulness is at an end.

The principal objects of my invention are, to provide a pipe closure of the class described, which may be applied to the end of the pipe quickly and efficiently; to provide a pipe closure of the class described which shall be capable of being used several times on different pipe ends, instead of once only; to provide a pipe closure which will adapt itself to fit pipes of varying diameter and contour; to provide a pipe closure of the class described which may be quickly removed from the end of the pipe without damage either to the pipe or to the closure; to provide a pipe closure of the class described which shall be simple in design and economical to manufacture; and, in general, to provide an improved pipe closure of the character referred to.

In the drawings, which illustrate my invention as applied to the socket end of a cast iron water pipe—

Figure 1 is an axial section through the end of a pipe showing my improved device applied thereto;

Fig. 2 is an end elevation of Fig. 1; and

Fig. 3 is a section taken on the line 3—3 of Fig. 1.

In the drawings 10 is a cast iron pipe having a socket end portion 11 within which is designed to fit the spigot end of a similar pipe. In order to accommodate the spigot end of the next succeeding section, the internal diameter of the socket is enlarged, as shown, and has an internal shoulder 12, it being understood that the pipe with its socket is in all respects a standard cast iron water pipe of customary design.

In order to seal the open end of the pipe, I utilize a disk plug 13 between which and the shoulder 12 is interposed a sealing gasket 14 of flexible material, such as rubber. The pressure of water or other fluid in the pipe is resisted by the end 15 of a set screw 16 engaging a central boss 17 on the outside of the sealing disk 13, the outer face of said sealing disk 13 being also ribbed, as shown at 18, in order to strengthen the same. The set screw 16 is threaded into a nut 19 forming an integral part of a relatively stationary bridge member 20 which thus receives the thrust due to the pressure exerted by the screw 16 upon the sealing disk 13.

In order to make the closure capable of accommodating itself to pipes of slightly varying diameter and contour, the bridge piece 20 is connected to and carried by the novel clamping means, which will now be described. As shown, the bridge piece 20 is ribbed for the purpose of strength and has a pair of opposed end extensions 21 and 22 which enter between the side flanges of a pair of opposed similar jaw members or clamps 23 and 24. The said clamps 23 and 24 are pivoted upon the opposite ends of a tie-piece 25, said tie-piece having a central aperture large enough to admit freely the threaded portion of the set screw 16. The pins 26 and 27, which provide the pivotal connection between the tie-piece 25 and the jaws 23 and 24, preferably are fixed in the flanges of the clamp members 23 and 24 by slightly upsetting the ends, the bridge piece 25 having free rotary movement on said pins.

When the clamps 23 and 24 are fitted over the socket end of the pipe so as to grip the same behind the shoulder or flange 28, the set screw 16, upon being rotated by a suitable wrench, will compress the gasket 14 between the shoulder 12 and the sealing disk 13. The end thrust upon the bridge piece 20 is communicated to the outer ends of the jaw clamps 23 and 24 by reason of the parts 21 and 22 engaging the parts 29 and 30 on the ends of said jaw clamps, the outer ends of said jaw clamps 23 and 24 thus being forced apart, due to the wedging or cam action which occurs between the parts 29 and 30 and the inclined ribs 31 and 32 with which said parts 29 and 30 engage. There is thus a tendency for the jaw clamps 23 and 24 to rotate slightly on the ends of the tie-piece 25, thereby forcing the inner ends 33 and 34 of said jaw clamps firmly into engagement with the outside of the pipe behind the flange 28.

It will be readily seen that the clamps 23 and 24 will accommodate themselves to pipes having slightly varying diameters; in fact, by selecting a suitable inclination for the ribs 31 and 32 and proportioning the dimensions of the other parts of the device, the closure may be adapted for a pipe having no flange.

In order to prevent the jaw clamps 23 and 24 from swinging too far, thus causing loss or displacement of the part 31, I prefer to form the outer ends of the cross-piece 25 with a pair of extensions, as at 35. Also, for facilitating application of the testing pressure, where the device is used for testing purposes or for discharging the dead water from the pipe system when it is desired to make an extension of the piping, I provide in the sealing disk 13 a threaded hole 36, which hole is sealed by a suitable threaded plug when the device is used for sealing the dead end for a future extension.

Since the details disclosed in this application are merely illustrative of my invention, it must be understood that the scope thereof must be determined by reference to the appended claims.

I claim—

1. In a pipe closure, a seal, means for moving said seal to close the pipe, arms associated with said means for engagement with the pipe, and a spacing member for said arms between said seal and said means.

2. In a closure for the open end of a pipe, a seal, a screw, a bridge, said screw and bridge adapted to force said seal into contact with the open end of said pipe, clamps on said bridge, and a connecting member interposed between the bridge and said open end of the pipe for said clamps.

3. The combination of a pipe provided with an open end, a member adapted to close said open end, means for causing such closing, gripping members associated with said means for engagement with said pipe, and a tie pivotally connecting said gripping members, said closing means having cam engagement with said gripping members.

4. The combination of a pipe having a seat, a sealing member fitting said seat, a screw for forcing said sealing member toward said seat, a bridge for said screw, clamping means associated with said bridge, and a tie-piece pivotally connecting said clamping means, said bridge having cam engagement with the ends of said gripping means whereby the outward movement of said bridge causes a relative pivotal movement of said clamping means and said tie-piece.

5. The combination of a pipe having a socket and an internal outwardly facing seat in said socket, a sealing disk fitting over said seat, a gasket interposed between said sealing disk and said seat, a screw coaxial with said pipe socket for forcing said sealing disk toward said seat, a threaded bridge piece for said screw, clamping jaws extending from opposite ends of said bridge piece to opposite sides of the socket, and a tie-piece pivotally connecting said jaws and interposed between said bridge piece and the outer end of said socket.

6. The combination of a pipe having a socket and an internal outwardly facing seat in said socket, a sealing disk fitting over said seat, a gasket interposed between said sealing disk and said seat, a screw coaxial with said pipe socket for forcing said sealing disk toward said seat, a threaded bridge piece for said screw, clamping jaws extending from opposite ends of said bridge piece to opposite sides of the socket, and a tie-piece pivotally connecting said jaws and interposed between said bridge piece and the outer end of said socket, said bridge member having cam engagement with the outer ends of said jaws whereby an outward movement of said bridge piece tends to effect a pivotal movement of said jaws and said tie-piece.

JOHN J. KENNY.